Patented June 21, 1938

2,121,642

UNITED STATES PATENT OFFICE 2,121,642

SYNTHETIC RESIN

Israel Rosenblum, Jackson Heights, N. Y.

No Drawing. Application November 3, 1934,
Serial No. 751,419

17 Claims. (Cl. 260—4)

The present invention relates to the production of synthetic resins of the phenol-formaldehyde type and has for its object to produce an oil-soluble resin by the reaction of a phenolic body and an aldehyde, preferably formaldehyde either in aqueous solution or in the form of a polymer; such resins having a high molecular weight and being characterized by substantially complete non-reactivity and possessing, even when not treated with an esterifying or neutralizing agent, a relatively low acid number.

The present application is a continuation-in-part of my copending applications Ser. No. 594,379, filed Feb. 20, 1932; Ser. No. 580,495, filed Dec. 11, 1931; and Ser. No. 538,248, filed May 18, 1931.

It is an object of the present invention to produce a resin of the type indicated above which is more or less permanently fusible, that is, can be repeatedly melted for an indefinite period of time and brought to the liquid condition without becoming permanently hardened, that is, rendered infusible. The resins of my improved type are thus stable at the temperatures commonly employed in the art of varnish making, and will not further react or condense to any appreciable extent upon heating at elevated temperatures, the resins having a rather definite melting point and remaining liquid at the elevated temperatures for indefinite periods of time.

My improved resins are characterized by a relatively high aldehyde content, the formaldehyde ratio being at about 0.8 mol. of formaldehyde to one mol. of phenol in the case of cresol (the commercial mixture of ortho, para and meta cresol) to about 2 mols of formaldehyde per mol. of phenol in the case of more or less pure para cresol, and even higher proportions of formaldehyde in the case of mixtures of ordinary phenol (carbolic acid) and the higher phenol homologues, such as para tertiary butyl and amyl phenols and in the case also of such higher homologues in the absence of ordinary phenol.

It is a particular object of the present invention to provide a simple and inexpensive process for obtaining fusible and oil-soluble phenol-aldehyde resins wherein the phenolic body comprises a mixture of ordinary phenol and the higher homologues of phenol, such homologues having substituting groups preferably in the para position, oil-soluble resins being obtained even though the proportion of ordinary phenol preponderates considerably over that of the higher homologue or homologues.

I have found that phenol-aldehyde resins of an improved character can be obtained by effecting the condensation of the phenolic and aldehyde bodies in the presence of a high boiling terpene hydrocarbon, such as dipentene. By high boiling terpene hydrocarbons I mean those which boil above pinene, which is the primary component of turpentine. If desired, the dipentene or equivalent high boiling hydrocarbon may be added to the reaction mixture after the condensation has proceeded to some extent.

In accordance with the invention, the phenol or mixture of phenols and the aldehyde are condensed in the presence, for example, of dipentene and preferably also in the presence of a catalyst at a temperature of about 100° C. under reflux or at about 110° C. under pressure. The water of solution of the formaldehyde is then expelled, after which the temperature is slowly raised to approximately the boiling point of the terpene hydrocarbon to expel volatile matter. The temperature may then be raised until a resin of the desired hardness is obtained. In this way, I obtain an oil-soluble resin which is solid at room temperatures and is characterized by high molecular weight, a commercially low acid number and more or less permanent fusibility.

My improved resins are non-reactive in character, by which I mean that the exothermic reaction resulting in the formation of the resinous condensate is substantially completed and the resin will ordinarily not foam and become appreciably harder or infusible on heating. The resins are thus practically no longer self-reacting, that is, they are not potentially reactive, although they may, of course, and can react with other bodies, such as varnish oils, neutralizing agents, etc. This property of non-self-reactivity I have observed in a large number of resins produced by me in accordance with the present invention, but it is to be understood that although I prefer to carry the condensation to the point where a resin solid at room temperature and no longer self-reactive is obtained, the invention is not limited to the production of a solid or of a non-reactive or stable material, as the reaction may be stopped at a point at which the resin is capable of further reaction and condensation.

The resins produced in accordance with the present invention are compatible with the usual solvents for such resins and also with natural resins and their esters and can be mixed in all proportions therewith. If desired, a natural resin or its ester may be present during the condensation of the phenol and formaldehyde, and when an acidic natural resin is employed, it may be neutralized in known manner. The resins form stable solutions in or reaction products with varnish oils and yield lustrous hard flexible strongly adhering films when made up into varnishes, paints and enamels or other coating compositions.

I have found that heating of the reaction mass to the boiling point of the dipentene or equivalent high boiling hydrocarbon and even to higher temperatures does not operate to expel all of the dipentene. It therefore appears that, in spite of the fact that hydrocarbons are ordinarily characterized by inertness, the dipentene has entered into some kind of chemical reaction or changed the usual course of condensation, producing compounds which are characterized by oil-solubility, stability and fusibility and low acid value.

The reaction may and preferably does take place in the presence of a catalyst, which among other things effects rapid binding of the terpene material and of the aldehyde and thus prevents loss of valuble material. While the known acid and basic catalysts may be employed, I prefer to use the more or less neutral organic salts of zinc, calcium, barium, strontium, lead, cobalt, manganese, nickel, etc. The use of zinc acetate or abietate is preferred. The oxides of the metals can also be used.

The invention will be further described in greater detail by reference to the following examples which illustrate several modes of carrying out the same.

Example 1

108 grams (1 mol.) cresol (commercial mixture of ortho, meta, and para cresol)
60 grams (0.8 mol.) 40% formaldehyde solution
108 grams dipentene
10 cc. 2N hydrochloric acid are condensed in a flask by heating at the boiling point with a reflux condenser for about four hours. The material is then dehydrated by removing the condenser and heating to 110° C. The dipentene which is carried over with the expelled vapors is returned to the flask or is replenished. The heating is then carried to higher temperatures (about 220–250° C.) to effect a further condensation reaction, until a resin which is solid and brittle at room temperature is obtained, dipentene being expelled during such heating. This resin containing only about 10% combined dipentene is permanently fusible and is soluble in fatty oils.

When the same condensation is carried on without the dipentene, a resin is obtained which, although fusible, is not soluble in fatty oils.

Example 2

108 grams (1 mol.) cresol (ortho, meta, para)
60 grams (0.8 mol.) 40% formaldehyde solution
108 grams dipentene are condensed by refluxing at the boiling point for five hours. The condenser is then removed and the material is dehydrated and heated to about 130° C. at which temperature it is kept for two hours for further condensation. The mass is then heated to higher temperatures to expel excess dipentene and cresol until at about 240–250° C. there is obtained a resin which is soluble at room temperatures and is readily soluble in fatty oils on moderate heating.

When the same condensation is carried out in the same manner without dipentene, a plastic resin is obtained already after two hours' heating at 130° C. By careful heating at 150° C. (as the resin is reactive) a brittle resin is obtained. At no stage is this resin soluble in fatty oils.

Example 3

108 grams (1 mol.) para cresol
150 grams (2 mols) 40% formaldehyde solution
10 cc. 2N hydrochloric acid
108 grams dipentene are condensed by refluxing at boiling point for about four hours. The condenser is then removed and the material is dehydrated and the carried over dipentene replenished. The heating is now carried on to higher temperature to remove volatiles, including most of the dipentene, the condensation and reaction continuing at the elevated temperatures. At 200° C. (approximately) a resin is obtained which is solid and brittle at room temperature, containing about 15% combined dipentene and being readily soluble in fatty oils.

When the same condensation is carried out without dipentene, a viscous reactive resin is obtained at about 130° C. After heating to about 150° it is changed to a brittle resin. At no stage is this resin soluble in fatty oils.

Example 4

108    grams (1 mol.) para cresol
150    grams (2 mols) 40% formaldehyde solution
108    grams dipentene
0.25   gram zinc acetate as catalyst are condensed by refluxing at the boiling point for about 15 hours. The condenser is then removed and the material dehydrated and then heated to about 130° C. at which temperature it is kept for two hours for further condensation. The dipentene which is carried over with the distilled vapors is replenished and the heating is then carried on at higher temperatures. At 180° C. a resin is obtained which is solid and brittle at room temperatures. The resin contains about 15% combined dipentene and is soluble in fatty oils on moderate heating.

Without dipentene an oil-insoluble resin is obtained under the same conditions.

Example 5

71     grams (¾ mol.) phenol
41     grams (¼ mol.) amyl phenol
225    grams (3 mols) 40% formaldehyde
0.25   gram zinc acetate
112    grams dipentene are condensed by refluxing at the boiling point for about 15 hours. The material is dehydrated, then heated to about 130° C. and kept at this temperature for about 2 hours. Care should be taken to replenish the dipentene lost with the distilled vapors so that the amount of dipentene present should again about equal the weight of phenols.

The material is now heated to a higher temperature to remove volatile matter, until at about 200° a resin is obtained which is solid and brittle at room temperature, the resin containing about 15% of combined dipentene. It is readily soluble in fatty oils.

When the same operation is carried out without dipentene, a resin is obtained which is already hard after the heating to about 150° C. and is not soluble in fatty oils at any stage.

*Example 6*

Same as in Example 5 except that instead of amyl phenol, butyl phenol is used. In both examples the use of the paratertiary phenol is preferred.

*Example 7*

164 grams (1 mol.) amyl phenol
225 grams (3 mols) 40% formaldehyde solution
164 grams dipentene
1 gram zinc acetate are condensed by refluxing for about 15 hours. The condenser is then removed and the material is dehydrated, the temperature is then brought up to about 130° C. and kept there for about 2 hours. It is then heated to about 250° until practically all volatile matter is removed. A pale brittle resin of acid number about 35 is obtained, which is soluble in fatty oils on moderate heating.

Without dipentene a dark, non-stable, self-reactive resin is obtained of acid number about 90.

*Example 8*

Any of the previous Examples 1–7 is carried out in presence of any desired proportion of natural resin ester, such as glycerol triabietate.

*Example 9*

Any of the previous Examples 1–7 is carried out in the presence of any desired proportion of rosin. At about 160° C. about 10% glycerol (based on the weight of rosin) is added and the esterification carried out in known manner.

In all of the above examples, the initial condensation may take place under pressure (about 10 lbs.) at about 110° C. in place of under reflux.

While I prefer to carry the condensation to the point at which a resin solid at room temperature is obtained, the reaction may be stopped at an earlier stage as indicated above, or various materials, such as solvents or varnish oils, may be added so that a coating composition or oil varnish is obtained as the final product.

The proportions of materials, temperatures, times of heating etc. may be varied from those specified hereinabove, especially when batches of different sizes are worked with, without departing from the spirit or scope of the invention.

I claim:

1. The method which comprises reacting a phenolic body including a homologue of phenol, with an aldehyde in the presence of a terpene material consisting primarily of dipentene until a resin containing a considerable proportion of dipentene in chemical combination is obtained.

2. The method which comprises reacting a mixture of phenols with formaldehyde in the presence of a terpene material consisting primarily of dipentene and continuing the condensation at approximately the boiling point of the mixture until an oil-soluble resin which is solid at room temperature and containing a considerable proportion of dipentene in chemical combination is obtained.

3. The method which comprises reacting a major proportion of phenol and a minor proportion of a para-alkyl phenol with formaldehyde in the presence of a terpene material consisting primarily of dipentene and of a catalyst until an oil-soluble resinous reaction mass containing a considerable proportion of dipentene in chemical combination is obtained.

4. The method which comprises reacting a mixture of phenol and amyl phenol with formaldehyde in the presence of a terpene material consisting primarily of dipentene and of a catalyst, expelling the water and then heating the reaction mass to approximately the boiling point of the dipentene and continuing the heating until uncombined dipentene has been expelled and an oil-soluble resin which is solid at room temperature and contains a considerable proportion of dipentene in chemical combination is obtained.

5. The method which comprises reacting an initial condensation product of a phenolic body including a homologue of phenol, and an aldehyde with a terpene material consisting primarily of dipentene, continuing the reaction at approximately the boiling point of the mixture until most of the dipentene has been expelled and an oil-soluble resin which is solid at room temperature and contains at least about 10% of dipentene in chemical combination is obtained.

6. An oil-soluble resin substantially solid at room temperature and comprising the reaction product of the condensate of approximately 1 mol. of para cresol and 2 mols of formaldehyde, and a terpene material consisting primarily of dipentene, said resin containing a considerable proportion of dipentene in chemical combination.

7. An oil-soluble, substantially solid and non-reactive resin comprising the reaction product of a condensate of approximately 1 mol. of amyl phenol and 3 mols of formaldehyde, and a terpene material consisting primarily of dipentene, said resin containing a considerable proportion of dipentene in chemical combination.

8. The method of improving the oil-solubility of phenol-formaldehyde resins which comprises reacting a mixture containing a substantial proportion of phenol and at least one of the group of phenol homologues consisting of butyl and amyl phenols with formaldehyde in the presence of a terpene material consisting primarily of dipentene until an initial condensate is produced, and then heating the mass to temperatures of the order of 200°–250° until substantially all of the volatile matter has been expelled.

9. The method which comprises effecting chemical combination between a phenolic body, a terpene material consisting primarily of dipentene and an aldehyde in the presence of a catalyst until a fusible, soluble resin containing a considerable proportion of dipentene in chemical combination is obtained.

10. The method which comprises effecting chemical combination between a phenolic body, a terpene material consisting primarily of dipentene, and formaldehyde with the aid of hydrochloric acid until a fusible and soluble resin containing a considerable proportion of dipentene in chemical combination is obtained.

11. The method which comprises effecting chemical combination between a quantity of a phenolic body, an approximately equal quantity of dipentene, and an aldehyde in the presence of a catalyst.

12. A resinous condensate suitable for the manufacture of coating compositions and containing in chemical combination a phenolic body, an aldehyde and a terpene material consisting primarily of dipentene.

13. A fusible and soluble resin containing in chemical combination a phenolic body including a homologue of phenol, an aldehyde and a terpene material consisting primarily of dipentene.

14. An oil-soluble resin solid at room temperature and containing in chemical combination a mixture of phenol and a homologue of phenol, formaldehyde and a terpene material consisting primarily of dipentene.

15. An oil-soluble resin substantially solid at room temperature and comprising the reaction product of approximately 1 mol. of mixed cresols, 0.8 mol. of formaldehyde, and a terpene material consisting primarily of dipentene, said resin containing a considerable proportion of dipentene in chemical combination.

16. A fusible, resinous condensate, solid at room temperature and suitable for the manufacture of coating compositions, said condensate containing in chemical combination a phenolic body, formaldehyde and dipentene, the latter constituting at least about 10% by weight of the total condensate.

17. A resinous condensate suitable for the manufacture of coating compositions and containing in chemical combination a phenolic body, an aldehyde and a terpene material consisting primarily of dipentene, and produced with the aid of hydrochloric acid.

ISRAEL ROSENBLUM.